(12) United States Patent
Kishida et al.

(10) Patent No.: US 10,370,253 B2
(45) Date of Patent: Aug. 6, 2019

(54) SILICON REFINING DEVICE

(75) Inventors: Yutaka Kishida, Tokyo (JP); Hitoshi Dohnomae, Tokyo (JP)

(73) Assignee: Silicio Ferrosolar S.L., Madrid (ES)

( * ) Notice: Subject to any disclaimer, the term of this patent is extended or adjusted under 35 U.S.C. 154(b) by 133 days.

(21) Appl. No.: 14/381,150

(22) PCT Filed: Mar. 9, 2012

(86) PCT No.: PCT/JP2012/056113
§ 371 (c)(1),
(2), (4) Date: Oct. 16, 2014

(87) PCT Pub. No.: WO2013/132651
PCT Pub. Date: Sep. 12, 2013

(65) Prior Publication Data
US 2015/0033798 A1    Feb. 5, 2015

(51) Int. Cl.
*C01B 33/037* (2006.01)
*B01J 6/00* (2006.01)

(52) U.S. Cl.
CPC ............. *C01B 33/037* (2013.01); *B01J 6/007* (2013.01); *B01J 2219/00155* (2013.01)

(58) Field of Classification Search
CPC ............ B01J 2219/00155; B01J 6/007; C01B 33/037
(Continued)

(56) References Cited

U.S. PATENT DOCUMENTS 4,956,153 A * 9/1990 Yamagishi ............... C30B 15/14
117/217
5,248,378 A * 9/1993 Oda ......................... C30B 15/14
117/217
(Continued)

FOREIGN PATENT DOCUMENTS

JP    2006-232658 A    9/2006
JP    2011-016691 A    1/2011
(Continued)

OTHER PUBLICATIONS

Computer translation and Patent Abstract of Japan JP 2011-016691 A.
(Continued)

*Primary Examiner* — Scott R Kastler
*Assistant Examiner* — Michael Aboagye
(74) *Attorney, Agent, or Firm* — The Webb Law Firm (57) ABSTRACT

Provided is a silicon refining device that is used when industrially producing silicon of high purity by vacuum melting, has a high P removal rate and thus high productivity, and is a practical device cost-wise with a simple and cheap device configuration. This silicon refining device comprises, in a decompression vessel provided with a vacuum pump, a crucible that contains a metal silicon material, a heating device that heats the crucible, and a molten metal surface thermal insulation member that covers the upper portion of silicon molten metal and has an exhaust opening with an opening area that is smaller than the silicon molten metal surface area. The molten metal surface thermal insulation member comprises a laminated insulation material with a multilayer structure in which three or more laminates are laminated at predetermined intervals from each other, and which exhibits a radiant heat insulating function based on the multilayer structure.

14 Claims, 4 Drawing Sheets

(58) Field of Classification Search
USPC .......... 65/355, 134.2; 423/348–350; 266/161
See application file for complete search history.

(56) References Cited

U.S. PATENT DOCUMENTS

| | | | |
|---|---|---|---|
| 2010/0197070 A1* | 8/2010 | Stoddard ............... | C30B 11/003 |
| | | | 438/68 |
| 2011/0158887 A1* | 6/2011 | Stoddard ............... | C30B 11/001 |
| | | | 423/348 |
| 2012/0103020 A1* | 5/2012 | Matsumoto ........... | C01B 33/037 |
| | | | 65/134.2 |

FOREIGN PATENT DOCUMENTS

| | | | | |
|---|---|---|---|---|
| JP | 2011016691 | * | 1/2011 | .......... C01B 33/037 |
| JP | 2012-025646 A | | 2/2012 | |

OTHER PUBLICATIONS

Computer translation and Patent Abstract of Japan JP 2012-025646 A.
Computer translation and Patent Abstract of Japan JP 2006-232658 A.

* cited by examiner

SILICON REFINING DEVICE

RELATED APPLICATION INFORMATION

This application is a 371 of International Application PCT/JP2012/056113 filed 9 Mar. 2012 entitled "Silicon Refining Device", which was published on 12 Sep. 2013, with International Publication Number WO 2013/132651 A1, the content of which is incorporated herein by reference.

FIELD OF THE INVENTION

The present invention relates to a silicon refining device for refining cheap metal silicon materials with high concentrations of impurities and producing high purity silicon that can be preferably used as a raw material in the production of solar cells, etc.

BACKGROUND OF THE INVENTION

Most high purity silicon used in the production of solar cells is presently produced using a chlorine chemical technique known as the so-called Simens method. However, although silicon of sufficiently high purity used for producing semiconductor elements can be obtained based on this Simens method, it is problematic in that production costs are high, silicon chloride waste regarded as poisonous gases are generated in large quantities, substantial resources are required in order to construct production facilities, etc. Accordingly, regarding the production of high purity silicon used in producing solar cells for which increased demand is expected in the future, the supply is limited by the Simens method.

On the other hand, regarding high purity silicon used in the production of solar cells, as sufficiently high purity for producing semiconductor elements is not required, a process for producing cheap high purity silicon in large quantities has been developed using metallurgical techniques such as vacuum melting, solidification refining, etc.

The production process of high purity silicon based on these metallurgical techniques involves a process of refining impure elements by combining metallurgical sub-processes using differences in physical behaviour between impure elements and silicon, wherein the application of vacuum melting utilizing a sub-process that removes impure elements with higher vapor pressures than Si (silicon) represented by P (phosphorous) has been specifically considered. Hereinafter, the removal of P via this vacuum melting is referred to as "P removal"; moreover, during this P removal, impure elements other than P with higher vapor pressures than Si are simultaneously removed.

The silicon refining device used for this vacuum melting is basically of a configuration in which a crucible for housing a metal silicon material and a heating device such as a heater are disposed in a vessel capable of reducing the pressure (a decompression vessel) having a vacuum pump. Further, a metal silicon material containing P higher than several tens of ppm is filled into said crucible and this metal silicon material is heated and melted into an inactive gas under decompression, enabling P removal by maintaining the obtained silicon molten metal for a constant time under decompression and at a temperature no lower than the melting point. The P concentration in Si decreases with time as P with a higher vapor pressure than Si is selectively vaporized by this P removal operation.

As a silicon refining device that has been used thus far in the implementation of vacuum melting, conventional arts such as described in Patent Document 1, Non-patent Document 1, Non-patent Document 2, Non-patent Document 3, Non-patent Document 4, etc. are known. As the silicon refining device used for these conventional arts has a basic structure in which a crucible and a general heating device are disposed in a decompression vessel, the silicon refining device has a cheap device configuration; however, the silicon refining device has a low P removal rate, in other words, it is problematic in that the silicon refining device is impractical due to its low productivity. Moreover, regarding some of the abovementioned conventional arts, it has been reported that the P concentration in the metal silicon material cannot be refined to approximately 0.05 ppm or less, as is required for high purity silicon used in the production of solar cells, making it a quality problem as well.

On the other hand, conventional arts as described in Non-patent Document 5, Patent Document 2, Patent Document 3, Patent Document 4, Patent Document 5, Patent Document 6, Patent Document 7, Patent Document 8 are also known as practical silicon refining methods with high P removal rates and high productivity. However, as these conventional arts are based on electron beam melting, the facilities and facility costs become enormous, creating a practical problem due to facility costs. Particularly, as disclosed in Patent Document 2 and Patent Document 7, based on a method of using electron beams as a means of heating and melting, it is necessary to set a plurality of crucibles in a vacuum vessel, which is problematic in that greater facility costs are required.

Against such a background, a silicon refining device that can achieve a sufficient P removal rate using a comparatively simple and cheap device configuration has been suggested, the silicon refining device comprising: a crucible in a decompression vessel provided with a vacuum pump; a heating device in the decompression vessel; and an impurity condenser provided with a cooling system and a raising and lowering device configured to condense and remove impurities evaporated from a silicon molten metal during heating of the crucible, which is arranged on a silicon molten metal surface in said crucible or at a location from which one or both crucible opening portions can be seen (Patent Document 9).

Figure 8:
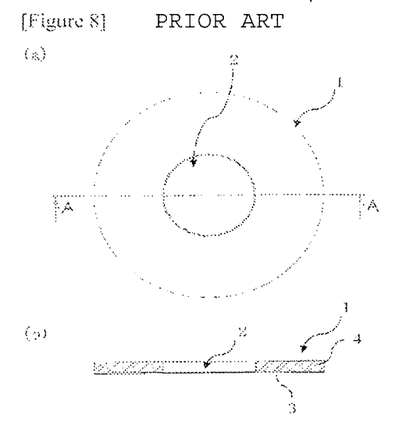
FIG. 8 includes a plan explanatory view (a) similar to FIG. 2 illustrating a molten metal surface thermal insulation member employed by a conventional silicon refining device, along with a cross-sectional view (b) taken along line A-A thereof.
Figure 9:
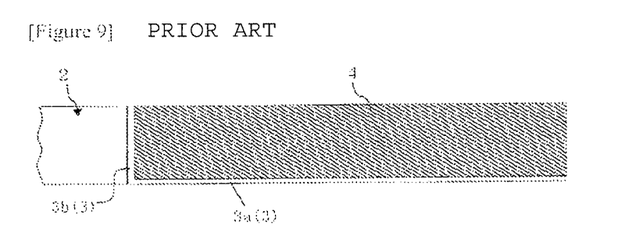
FIG. 9 is a partial enlarged cross-sectional explanatory view of a cross-sectional view (b) taken along line A-A of FIG. 8.

Moreover, in Patent Document 10, a silicon refining device is proposed, wherein, in the silicon refining device having a crucible and a heating device in a decompression vessel provided with a vacuum pump, for example, as illustrated in FIG. 8 and FIG. 9, molten metal surface thermal insulation member 1 is provided in the upper portion of the crucible, said molten metal surface thermal insulation member 1 comprising: support member 3 having support part 3a formed in a ring shape by a graphite flat plate with the center thereof open and cylindrical part 3b constructed on the center opening edge of this support part 3a of a certain height; insulation material 4 made of a fiber such as a carbon-made felt provided on the upper face of support part 3a of this support member 3; and exhaust opening 2 formed by cylindrical part 3b of said support member 3, with a smaller opening area than the silicon molten metal surface area in said crucible; wherein, the silicon molten metal surface is moisturized by this molten metal surface thermal insulation member 1 to be deposited onto the surface of the silicon molten metal for preventing SiC particles from obstructing the vaporization of impurities and further, in Patent Document 11, in lieu of such a molten metal surface thermal insulation member, a silicon refining device is proposed, the silicon refining device covering the upper end opening of a crucible at the upper portion of the crucible and having an exhaust opening with a smaller opening area than the silicon molten metal surface area, within the crucible, comprising a ring-shaped moisturizing cap that can be exchanged while heating the crucible.

PRIOR ART DOCUMENTS

Patent Document

Patent Document 1: The specifications of U.S. Pat. No. 4,304,763
Patent Document 2: Japanese Unexamined Patent Application Publication No. 1995-315, 827
Patent Document 3: Japanese Unexamined Patent Application Publication No. 1995-309, 614
Patent Document 4: Japanese Unexamined Patent Application Publication No. 1997-309, 716
Patent Document 5: Japanese Unexamined Patent Application Publication No. 1998-167, 716
Patent Document 6: Japanese Unexamined Patent Application Publication No. 1998-182, 130
Patent Document 7: Japanese Unexamined Patent Application Publication No. 1999-209, 195
Patent Document 8: Japanese Unexamined Patent Application Publication No. 2000-247, 623
Patent Document 9: Japanese Unexamined Patent Application Publication No. 2005-231, 956
Patent Document 10: Japanese Unexamined Patent Application Publication No. 2006-232, 658
Patent Document 11: Japanese Unexamined Patent Application Publication No. 2012-025, 646

Non-Patent Document

Non-patent Document 1: Suzuki et al., Journal of the Japan Institute of Metals and Materials, February, 1990, Vol. 54, second issue, p. 161 to 167
Non-patent Document 2: Ikeda et al, IISJ International, 1992, Vol. 32, No. 5, p. 635 to 642
Non-patent Document 3: Yushita et al., Journal of the Japan Institute of Metals and Materials, October, 1997, Vol. 61, tenth issue, p. 1086 to 1093
Non-patent Document 4: Morita, Metal, AGNE Gijutsu Center Inc., 1999, Vol. 69, eleventh issue, p. 949
Non-patent Document 5: Photovoltaic Power Generation Technology Research Association, Energy and Industrial Technology Development Organization in 1998, Research and study on analysis of the practical use of technology for producing solar cell silicon materials, March, 1999, p. 81

SUMMARY OF THE INVENTION

Problem to be Solved by the Invention

Although the silicon refining device implementing the impurity condenser described in Patent Document 9 enables a sufficient rate of P removal by a comparatively simple and cheap device configuration, an impurity condenser provided with a cooling system along with a raising and lowering device is needed, with room for improvement in terms of configuration costs.

Moreover, unlike the case of Patent Document 9, the silicon refining device implementing the molten metal surface thermal insulation member described in Patent Document 10 sufficiently solves the problems of the conventional art thus far; however, for the case in which P removal processing has been performed for a long time by vacuum melting, the following new operational problems have been revealed.

Specifically, with P removal processing by vacuum melting, a substantial amount of Si is evaporated from the silicon molten metal surface along with the impurities as the Si steam passes through the opening of a discoid molten metal surface thermal insulation member disposed on the upper portion of the crucible; however, the Si steam partially builds up as condensation a part with a high temperature greater than the Si melting point on the upper portion in the thickness direction of this molten metal surface thermal insulation member when the Si steam passes therethrough. However, this molten metal surface thermal insulation member is normally formed by an insulation material made of a fiber such as carbon-made felt, allowing Si in a melted state to penetrate to the depths of the insulation material due to surface tension in the region where condensation occurs and only stopping when it reaches a location with a lower temperature than the melting point of silicon. Once Si penetrates the depths of the insulation material, the heat insulating effect of the insulation material at that location is lost, causing the temperature of the peripheral part to increase until it is higher than the melting point and leading to the further penetration of Si steam. In other words, once Si steam penetrates the insulation material, the Si that melts due to condensation penetrates throughout the insulation material. Accordingly, regarding the multiple operations that take place over an extended time, the function of insulation materials made of fiber as the insulation material is greatly impaired due to the infiltration of Si. It is apparent that the insulation material can be protected, for example, by a graphite ring; however, even in such a case, vaporized Si that enters the insulation material through gaps between the members, small gaps such as cracks due to deterioration of the members, etc. melts to penetrate throughout the insulation material as a result of surface tension. Thus, when the function of the insulation material is lost due to the infiltration of Si, the surface temperature of the silicon molten metal in the crucible during operation is lowered, SiC is deposited onto the surface and the surface of the silicon molten metal is coated with SiC, greatly impairing the P removal effect.

Moreover, although the silicon refining device described in Patent Document 11, which implements a ring-shaped moisturizing cap that can be exchanged while heating the crucible, is advantageous in that it has a high P removal rate and thus high productivity, multiple P removal processing can be performed for a long time, and the device configuration is comparatively simple as well, while heating the crucible, a storage place for exchanging the ring-shaped moisturizing cap and a raising and lowering device are necessary, along with provision of a spare exhaust chamber upon exchanging the moisturizing cap without breaking the vacuum in a decompression vessel, with room for improvement in terms of configuration costs.

Consequently, as a result of extensive research towards the development of a silicon refining device used in the production of high purity silicon for producing solar cells, for which increased demand is expected in the future, by vacuum melting, said silicon refining device having a high P removal rate and thus high productivity in addition to being capable of performing multiple P removal processing for a long time and being a practical device cost-wise, the present inventors concluded that the conventional problem of the molten metal surface thermal insulation member, wherein P removal processing for a long time becomes difficult as Si steam penetrates the laminated insulation material and impairs the heat insulation function, can be solved by employing a molten metal surface thermal insulation member comprising a laminated insulation material having a multilayer structure in which three or more laminates are laminated at predetermined intervals from each other in addition to exhibiting a radiant heat insulating function, thereby completing the present invention.

Accordingly, the object of the present invention is to provide a silicon refining device vacuum that can be preferably used when industrially producing high purity silicon based on a silicon refining method by melting, said silicon refining device having a high P removal rate and high productivity in addition to being a practical device cost-wise with a simple and cheap device configuration.

Means of Solving the Problem

In light of the above-described problems, the present invention has been created with the following configurations.

(1) A silicon refining device comprising, in a decompression vessel provided with a vacuum pump: a crucible with an opening at the upper end that contains a metal silicon material; a heating device that heats the crucible; and a molten metal surface thermal insulation member arranged on the upper portion of said crucible to cover the upper portion of silicon molten metal and having an exhaust opening with an opening area smaller than the silicon molten metal surface area, wherein the molten metal surface thermal insulation member comprises a laminated insulation material with a multilayer structure in which three or more laminates are laminated at predetermined intervals from each other, and which exhibits a radiant heat insulating function based on the multilayer structure.

(2) The silicon refining device described in (1), wherein said molten metal surface thermal insulation member comprises laminates of said laminated insulation material to form the multilayer structure, the laminates being respectively separated at intervals of 3 mm.

(3) The silicon refining device described in (1) or (2), wherein said molten metal surface thermal insulation member comprises laminates that are respectively formed by a lamina material made of a carbon fiber composite.

(4) The silicon refining device described in any one of (1) to (3), wherein said molten metal surface thermal insulation member is formed in a ring shape with an exhaust opening at the center thereof.

(5) The silicon refining device described in (4), wherein said molten metal surface thermal insulation member comprises a peripheral part that is detachably disposed on the upper portion of said crucible.

According to the present invention, a laminated insulation material of a molten metal surface thermal insulation member is required to be formed as a multilayer structure in which at least three or more laminates are laminated at predetermined intervals from each other, preferably five to twelve laminates. If the number of laminates is less than three, sometimes the heat insulation performance becomes insufficient; moreover, even if the number of laminates is increased to be more than 12, the costs gained from increasing the heat insulating effect are canceled out due to the increase in member costs. Here, regarding the number of laminates, as is generally known, because the radiant heat flux is reduced to about ½ for each additional blackboard and the insulation heat capacity practically needed is less than 1/10 the radiant heat flux from the surface of the silicon molten metal, at least four laminates are needed in total; however, as the support member also contributes to the insulation heat capacity, at least three laminates are needed in order to configure a laminated insulation material exhibiting the necessary radiant heat masking function. Although the radiant heat flux can be reduced to about 1/8,000 using twelve laminates, if the number of laminates is increased any further, in terms of the heat flow rate from the fluid level side of the crucible to the ceiling side of a furnace, the heat flow rate through the support member, etc. via heat conduction becomes larger than that traversing the insulation material, undermining any increase in the number of laminates.

Moreover, regarding the laminated insulation material of said molten metal surface thermal insulation member, the intervals between respective laminates configuring the multilayer structure are 3 mm or more, preferably, 4 mm or more; wherein, if intervals of 3 mm and over are not ensured, the silicon molten metal formed by condensation therefrom on this laminated insulation material enters the intervals between respective laminates via capillary action and, as a result, there is a concern that these intervals between respective laminates may be blocked and lose their radiant heat masking function based on the multilayer structure.

Moreover, regarding each laminate for forming the laminated insulation material of said molten metal surface thermal insulation member, although any high melting point metal such as titanium, molybdenum, tungsten, etc. can be used as the material thereof, in terms of preventing impurities in addition to high material costs, the material thereof is preferably a carbon fiber composite lamina material, generally, with a thickness preferably from 0.5 mm to 10 mm. If the thickness of the laminate is thinner than 0.5 mm, it becomes difficult to obtain a dense plate with a sufficient radiation masking function; on the other hand, the material cost for members thicker than 10 mm becomes higher as the manufacturing thereof is difficult.

According to the present invention, said molten metal surface thermal insulation member may be formed in a ring shape with an exhaust opening at the center thereof; moreover, said molten metal surface thermal insulation member may be formed in a configuration provided with three or more legs to be fixed or mounted onto the upper peripheral part of the crucible and having an exhaust opening formed into a discoid shape smaller than the inner diameter of the crucible, with a plurality of slits separated by respective legs between the peripheral part and the inner diameter of the crucible. Regarding the molten metal surface thermal insulation member formed in a ring shape, the peripheral part thereof may be fixed on the upper portion of the crucible or may be detachably disposed. Further, the size of the exhaust opening formed on the molten metal surface thermal insulation member is 3 to 20% the size of the silicon molten metal surface area.

Further, according to the present invention, for the case in which the ring-shaped molten metal surface thermal insulation member is detachably disposed on the upper portion of the crucible, by providing a storage place, a raising and lowering device, a spare exhaust chamber, etc. to the silicon refining device, as necessary, this molten metal surface thermal insulation member may be configured such that it can be exchanged while heating the crucible.

Effects of the Invention

According to the silicon refining device of the present invention, in industrially producing silicon of high purity based on the silicon refining method by vacuum melting, multiple P removal processes can be repeated for a long time and it is possible to maintain a large P removal rate by inhibiting the generation of SiC particle floating substances on the silicon molten metal surface during this time as much as possible, enabling the production of high purity silicon with high productivity. Further, the silicon refining device of the present invention is a practical device cost-wise with a simple and cheap device configuration, being very important for providing high purity silicon used in the production of solar cells, for which increased demand is expected in the future.

MODE FOR CARRYING OUT THE INVENTION

First Aspect of the Silicon Refining Device

Figure 1:
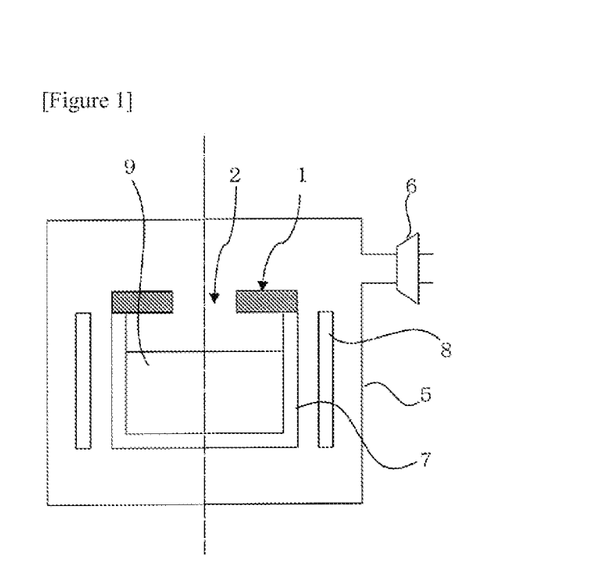
FIG. 1 is an explanatory view illustrating the concept of the first aspect of a silicon refining device according to the present invention.

As illustrated in FIG. 1, the first aspect of the silicon refining device according to the present invention basically comprises, in a decompression vessel 5 provided with a vacuum pump 6; crucible 7 with an opening at the upper end that contains a metal silicon material; heating device 8 that heats this crucible 7; and molten metal surface thermal insulation member 1 arranged on the upper portion of said crucible 7 to cover the upper portion of this silicon molten metal 9 and having an exhaust opening 2 with an opening area smaller than the silicon molten metal surface area of silicon molten metal 9; wherein, the silicon refining device increases the purity of the material by evaporating impurities contained in this silicon molten metal from the metal silicon material (silicon molten metal) melted using a vacuum. Here, refining in the present invention mainly refers to the removal of P; however, it also includes the removal of elements other than P with higher vapour pressures than Si, for example, Al, As, Sb, Li, Mg, Zn, Na, Ca, Ni, Ge, Cu, Sn, Ag, Tn, Mn, Pb, Tl, etc.

In the silicon refining device of the present invention, as vacuum pump 6 sufficiently reduces the pressure within decompression vessel 5 to 500 Pa or less, only an oil-sealed rotary pump is required; however, a mechanical booster pump may be provided in accordance with the size of decompression vessel 5 and, moreover, if an oil-diffusion pump and a turbo-molecular pump are provided, the vacuum sweeping time and P removal time can be further shortened.

Moreover, crucible 7 may be capable of enduring high temperatures and high vacuum conditions without reacting with silicon under these conditions, with the crucible preferably made of high-density graphite that does not generate reaction gas with silicon thought to be optimal. As a quartz crucible reacts with silicon under a high vacuum to generate SiO (silicon monoxide) gas, it is problematic in that a high vacuum cannot be maintained and silicon molten metal causes bumping due to swelling gas, rendering quartz crucibles unsuitable for vacuum melting in silicon refining.

Moreover, any heating device 8 can be applied as long as it can be heated to the melting point of silicon or higher; that said, a heater heating system is simplest, allowing the application of a voltage to a heating element made of graphite, etc. and heating crucible 7 along with silicon molten metal 9 by Joule heating. An induction heating system that heats silicon molten metal 9 by way of heating crucible 7 via induction current with an induction coil arranged outside crucible 7 made of graphite, etc. is also a low cost heating system that may preferably be used. Both heating devices are widespread simple heating systems for melting metal.

Embodiment 1 of the Molten Metal Surface Thermal Insulation Member

Figure 2:
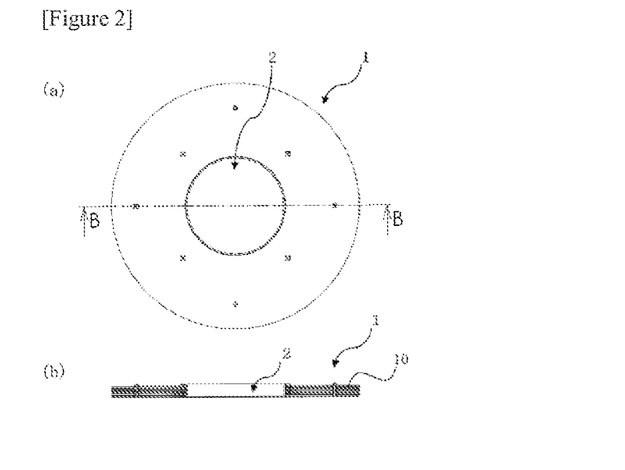
FIG. 2 includes a plan explanatory view (a) illustrating Embodiment 1 of a molten metal surface thermal insulation member employed by a silicon refining device according to the present invention, along with a cross-sectional view (b) taken along line B-B thereof.
Figure 3:
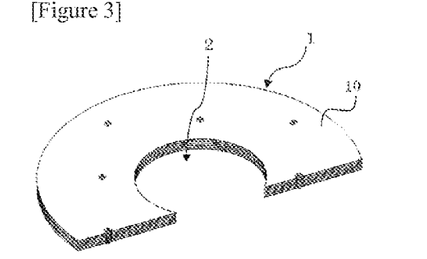
FIG. 3 is a perspective explanatory view illustrating a molten metal surface thermal insulation member of FIG. 2.
Figure 4:
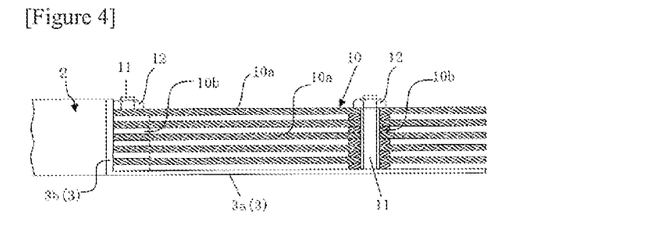
FIG. 4 is a partial enlarged cross-sectional explanatory view of a cross-sectional view (b) taken along line B-B of FIG. 2.

According to the silicon refining device of the present invention, for example, Embodiment 1 illustrated in FIGS. 2 to 4 is used as the abovementioned molten metal surface thermal insulation member 1.

Molten metal surface thermal insulation member 1 according to Embodiment 1 comprises support member 3 having support part 3a formed in a ring shape by a graphite flat plate with the center thereof open and cylindrical part 3b constructed on the center opening edge of this support part 3a of a certain height, and laminated insulation material 10 of a multilayer structure laminated on the upper surface of support part 3a of this support member 3 maintained with gaps of specific sizes.

Subsequently, laminated insulation material 10 is formed as a multilayer structure in which support part 3a and five laminates 10a of approximately the same shape are cut from a carbon fiber composite lamina material with a thickness of about 1 mm, these respective laminates 10a are laminated via graphite spacer 10b with a thickness of 4 mm, and gaps of 4 mm are respectively formed between support part 3a and these five laminates 10a.

Here, the material of support member 3 is preferably made of dense graphite, into which silicon steam (Si steam) evaporated from a silicon molten metal upon heating a crucible hardly penetrates, support part 3a and cylindrical part 3b are preferably densely joined, for example, by being combined in a pillbox structure for preventing penetration of as much Si steam as possible and, as necessary, support part 3a and cylindrical part 3b may be configured as a single body cut out from a single graphite base material.

According to this Embodiment 1, said spacer 10b with a minimum surface area may be inserted such that these respective laminates 10a can be stably fixed between respective laminates 10a. Specifically, M8 standard nuts, etc. made of commercial graphite with a thickness of 4 mm×a side length of 12 mm can be used. Moreover, between support member 3 and laminated insulation material 10 configuring molten metal surface thermal insulation member 1, in order to easily treat this molten metal surface thermal insulation member 1, as illustrated in FIG. 2(a), carbon composite fiber bolts 11 are constructed at eight positions of support member 3, as illustrated in FIG. 4, while respective laminates 10a and spacers 10b are threaded through by bolts 11 to be integrated by being fixed via a carbon fiber composite nut 12. Although it is sufficient for these respective laminates to be threaded by a bolt at three or more positions, increasing the number thereof allows the laminates to be stably arranged, enabling the intervals between respective laminates to be stably ensured.

Embodiment 2 of the Molten Metal Surface Thermal Insulation Member

Figure 5:
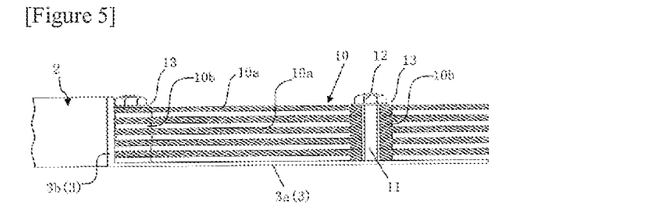
FIG. 5 is a partial enlarged cross-sectional explanatory view similar to FIG. 4 illustrating Embodiment 2 of a molten metal surface thermal insulation member employed by a silicon refining device according to the present invention.

FIG. 5 illustrates molten metal surface thermal insulation member 1 according to Embodiment 2; wherein, in contrast to the abovementioned Embodiment 1 illustrated in FIGS. 2 to 4, molten metal surface thermal insulation member 1 comprises laminate 10a and spacer 10b that are integrally formed to configure laminated insulation material 10, with carbon fiber composite washer 13 provided between nut 12 and uppermost laminate 10a.

Embodiment 3 of the Molten Metal Surface Thermal Insulation Member

Figure 6:
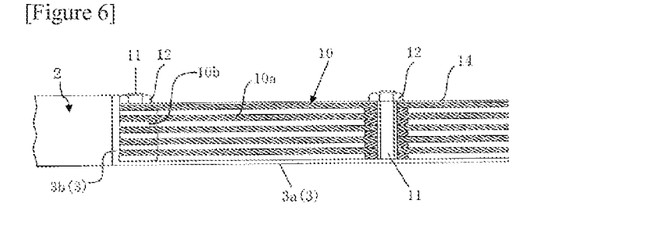
FIG. 6 is a partial enlarged cross-sectional explanatory view similar to FIG. 4 illustrating Embodiment 3 of a molten metal surface thermal insulation member employed by a silicon refining device according to the present invention.

FIG. 6 illustrates molten metal surface thermal insulation member 1 according to Embodiment 3; wherein, in contrast to the abovementioned Embodiment 1 illustrated in FIGS. 2 to 4, molten metal surface thermal insulation member 1 comprises laminated insulation material 10 that is formed by five laminates 10a, eight spacers 10b, and molybdenum-made surface material 14 with a thickness of 0.1 mm mounted so as to cover the upper surface of the uppermost laminate 10a formed by a density graphite material into which Si steam hardly penetrates along with support member 3, preventing the penetration of Si steam from the upper surface side of laminated insulation material 10 as much as possible.

Second Aspect of the Silicon Refining Device

Figure 7:
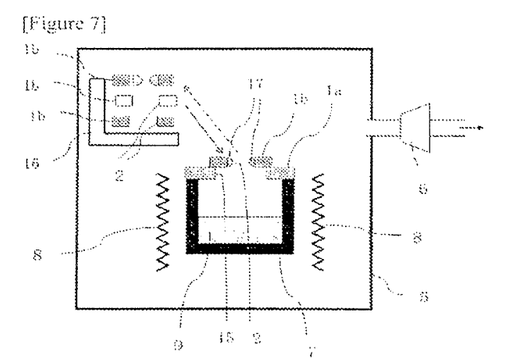
FIG. 7 is an explanatory view illustrating the concept of the second aspect of a silicon refining device according to the present invention.

FIG. 7 illustrates the second aspect of the silicon refining device according to the present invention. This silicon refining device, in contrast to the first aspect of the abovementioned silicon refining device, comprises center opening 15 with a smaller opening area than the surface area of silicon molten metal 9 in crucible 7 within decompression vessel 5 provided with vacuum pump 6 in addition to crucible 7 and heating device 8, ring-shaped first molten metal surface thermal insulation member 1a fixed to the upper end opening edge of crucible 7 similar to, for example, the abovementioned Embodiment 1 of the present invention, and exhaust opening 2 with a smaller opening area than the surface area of center opening 15 of this first molten metal surface thermal insulation member 1a, said silicon refining device provided with a plurality of ring-shaped second molten metal surface thermal insulation members 1b detachably mounted on the opening edge of center opening 15 of the first molten metal surface thermal insulation member 1a, along with storage place 16 for temporarily storing the second molten metal surface thermal insulation member 1b when not in use before being used and/or after being used; moreover, when Si and Si compound 17 adhere to the opening edge of exhaust opening 2 of the second molten metal surface thermal insulation member 1b when in use, the second molten metal surface thermal insulation members 1b can be exchanged while heating crucible 7 according to the number of this second molten metal surface thermal insulation member 1b via means such as a raising and lowering device (not illustrated).

In the second aspect of this silicon refining device, the first molten metal surface thermal insulation member 1a employs a configuration similar to the abovementioned molten metal surface thermal insulation member 1 of the present invention; however, both first molten metal surface thermal insulation member 1a and second molten metal surface thermal insulation member 1b may take on a configuration similar to the abovementioned molten metal surface thermal insulation member 1 of the present invention, or take on a configuration similar to the abovementioned molten metal surface thermal insulation member 1 of the present invention.

EXAMPLE(S)

Hereinafter, the silicon refining device of the present invention will be explained in detail, with reference to embodiments and comparative examples; however, the present invention is not limited to these embodiments and comparative examples.

The silicon refining device used in the following examples and comparative examples is the first aspect of the silicon refining device illustrated in FIG. 1, wherein, decompression vessel 5 comprises a cylindrical water-cooling jacket structure and vacuum pump 6 is a two-stage vacuum pump of an oil-sealed rotary pump→a mechanical booster pump; moreover, crucible 7 made of high purity graphite with an outer diameter of 1000 mm×inner diameter of 900 mm×depth (inner measurement) of 500 mm, heating device 8 comprising a heater made of high purity graphite that can supply a maximum electric power of 300 kW to the position covering the side and bottom surfaces of this crucible 7, and a carbon fiber insulation material covering the outsides of these are arranged within decompression vessel 5.

Comparative Example 1

The configuration of molten metal surface thermal insulation member 1 used in Comparative Example 1 is illustrated in FIGS. 8 and 9, support member 3 is configured by ring-shaped high-density graphite support part 3a with an outer diameter of 1000 mm×inner diameter 400 mm×thickness 40 mm and high-density graphite cylindrical part 3b with an outer diameter of 400 mm×inner diameter 380 mm×height 40 mm, and the area ratio of exhaust opening 2 to the silicon molten metal surface area is 20%. Moreover, ring-shaped insulation material 4 formed by a graphite felt with an outer diameter of 1000 mm×inner diameter 400 mm×thickness 40 mm as a thermal insulation member is placed on the upper surface of support part 3a of support member 3.

In this Comparative Example 1, based on P removal processing, 150 kg of a metal silicon material with an initial P concentration of 30 ppm is filled into the crucible by cooling in order to be vacuum-swept, the heater is energized once the pressure within the decompression vessel reaches a degree of vacuum of 5.0 Pa or less to initiate melting, all metal silicon materials are maintained for two hours by heating in a vacuum of 10 Pa once they have completely melted, and the silicon molten metal in the crucible is subsequently discharged, with this operation repeated eight times in the procedure for retrieving high purity silicon.

The P removal performance achieved in each of the first, second, fourth, sixth, and eighth operations during the successive eight operations performed in this Comparative Example 1 is evaluated according to changes in SiC production 30 minutes after the completion of melting and two hours after the completion of melting, along with the P removal rate (relative value). Under these operational conditions, SiC particles are sometimes generated after the completion of melting of the metal silicon material, with the generated SiC particles tending to gradually coat the silicon molten metal surface. As this SiC production relates to the deterioration in the P removal performance, the areas of the locations coated by SiC particles are respectively measured 30 minutes after the completion of melting and two hours after the completion of melting (completion of processing), and SiC production is evaluated using the ratio of this area coated by SiC particles to the silicon molten metal surface area; moreover, the P removal rate (relative value) is obtained from the initial P concentration of metal silicon material and the P concentration of silicon that is retrieved after processing and then refined. Further, the P concentration of refined silicon is measured using ICP emission spectrometry. The results are shown in Table 1.

Moreover, upon examining the state of the molten metal surface thermal insulation member once the eighth operation completed and the furnace cooled to ambient temperature, it was found that cracks were generated in the high-density graphite support member, in addition to the presence of signs that Si steam had entered the insulation material therefrom. Moreover, a large amount of Si penetrated the insulation material formed by graphite felt, with the bottom thereof fixed to the support part of the support member. Further, upon pulling this fixed region off and measuring the weight of the insulation material into which Si had penetrated, the weight of the insulation material was found to have increased by 33.4 kg from the original weight of 3.5 kg to 36.9 kg. This indicates that Si penetrated the part ranging up to 50% of the cubic measure of the insulation material, clearly indicating that insulation heat capacity had been lost.

TABLE 1

| Operation number | | First | Second | Fourth | Sixth | Eighth |
|---|---|---|---|---|---|---|
| SiC production (ratio: %) | 30 minutes after the completion of melting | 0.0 | 0.0 | 30 | 25 | 100 |
| | two hours after the completion of melting | 0.0 | 0.0 | 40 | 100 | 100 |
| P removal rate (relative value) | | 2.1 | 2.1 | 1.7 | 1.0 | 0.2 |

Example 1

Molten metal surface thermal insulation member 1 used in Example 1 relates to Embodiment 1 illustrated in FIGS. 2 to 4; wherein, in the same manner as Comparative Example 1, support member 3 was configured by ring-shaped high-density graphite support part 3a with an outer diameter of 1000 mm×inner diameter 400 mm×thickness 40 mm and high-density graphite cylindrical part 3b with an outer diameter of 400 mm×inner diameter 380 mm×height 40 mm, with an area ratio of exhaust opening 2 to the silicon molten metal surface area of 20%. Moreover, insulation laminated member 10 was formed by cutting six ring-shaped laminates 10a with an outer diameter of 1000 mm×inner diameter 400 mm×thickness 1 mm from a carbon fiber composite lamina material with a thickness of 1 mm, tucking spacer 10b made of M8 nut with a thickness of 4 mm between respective laminates 10a, threading respective laminates 10a with carbon composite fiber M6 stud bolt 11 constructed on support part 3a with each other, and fixing them using carbon composite fiber nut 12.

P removal processing was performed via the exact same procedure as in the case of Comparative Example 1, repeating this operation eight times. Moreover, the P removal performance over eight successive operations performed in this Example 1 was evaluated along with Comparative Example 1.

The results are shown in Table 2.

In this Example 1, no SiC particles were found generated on the silicon molten metal surface upon melting the metal silicon material, 30 minutes after the completion of melting and two hours after the completion of melting (completion of processing), all ratios of the coated area of SiC particles indicating SiC production on the molten metal surface area were 0, and the P removal rate (relative value) also did not change from the initial value of 2.1. Moreover, upon examining the state of the molten metal surface thermal insulation member after the eighth operation completed and the furnace cooled to ambient temperature, it was found that cracks had generated in the high-density graphite support member, in addition to signs that Si steam had entered the insulation material therefrom and Si had penetrated most surfaces of the laminated insulation member; however, as no Si remained between respective multilayer plates, it was determined that the radiation masking function was maintained.

TABLE 2

| Operation number | | First | Second | Fourth | Sixth | Eighth |
|---|---|---|---|---|---|---|
| SiC production (ratio: %) | 30 minutes after the completion of melting | 0.0 | 0.0 | 0.0 | 0.0 | 0.0 |
| | two hours after the completion of melting | 0.0 | 0.0 | 0.0 | 0.0 | 0.0 |
| P removal rate (relative value) | | 2.1 | 2.1 | 2.1 | 2.1 | 2.1 |

Comparative Example 2

Molten metal surface thermal insulation member 1 used in Comparative Example 2 relates to Embodiment 1 illustrated in FIGS. 2 to 4; wherein, in the same manner as Example 1, support member 3 was configured by ring-shaped high-density graphite support part 3a with an outer diameter of 1000 mm×inner diameter 400 mm×thickness 40 mm and high-density graphite cylindrical part 3b with an outer diameter of 400 mm×inner diameter 380 mm×height 40 mm, with an area ratio of exhaust opening 2 to the silicon molten metal surface area of 20%. Moreover, insulation laminated member 10 was formed by cutting two ring-shaped laminates 10a with an outer diameter of 1000 mm×inner diameter 400 mm×thickness 1 mm from a carbon fiber composite lamina material with a thickness of 1 mm, tucking spacer 10b made of M8 nut with a thickness of 4 mm between respective laminates 10a, threading respective laminates 10a with carbon composite fiber M6 stud bolt 11 constructed on support part 3a with each other, and fixing them using carbon composite fiber nut 12.

P removal processing was performed via the exact same procedure as in the case of Comparative Example 1 and Example 1, repeating this operation eight times. Moreover, the P removal performance over eight successive operations performed in this Comparative Example 2 was evaluated along with Comparative Example 1 and Example 1.

The results are shown in Table 3.

In this Comparative Example 2, in each of the first to eighth operations, SiC particles were found generated on the silicon molten metal surface upon melting the silicon material, 30 minutes after the completion of melting and two hours after the completion of melting (completion of processing), with the ratio of the coated area of SiC particles indicating SiC production on the molten metal surface area having increased from 25% to 40%. The P removal rate (relative value) was about 0.4 lower than the case of Example 1, the P removal rate being 1.7 in each operation number. Moreover, upon examining the state of the molten metal surface thermal insulation member after the eighth operation completed and the furnace cooled to ambient temperature, it was found that cracks had generated in the high-density graphite support member, in addition to there being signs that Si steam had entered the insulation material therefrom and Si had penetrated most surfaces of the laminated insulation member; however, no Si remained between respective multilayer plates. In other words, the two multilayer plates were soundly held even after eight operations; moreover, when the number of plates used as multilayer plates was two, the radiation masking function was insufficient.

TABLE 3

| Operation number | | First | Second | Fourth | Sixth | Eighth |
|---|---|---|---|---|---|---|
| SiC production (ratio: %) | 30 minutes after the completion of melting | 25.0 | 25.0 | 25.0 | 25.0 | 25.0 |
| | two hours after the completion of melting | 40.0 | 40.0 | 40.0 | 40.0 | 40.0 |
| P removal rate (relative value) | | 1.7 | 1.7 | 1.7 | 1.7 | 1.7 |

Example 2

Molten metal surface thermal insulation member 1 used in Example 2 relates to Embodiment 1 illustrated in FIGS. 2 to 4; wherein, in the same manner as Example 1, support member 3 was configured by ring-shaped high-density graphite support part 3a with an outer diameter of 1000 mm×inner diameter 400 mm×thickness 40 mm and high-density graphite cylindrical part 3b with an outer diameter of 400 mm×inner diameter 380 mm×height 40 mm, with the area ratio of exhaust opening 2 to the silicon molten metal surface area being 20%. Moreover, laminated insulation member 10 was formed by cutting six ring-shaped laminates 10a with an outer diameter of 1000 mm×inner diameter 400 mm×thickness 1 mm from a carbon fiber composite lamina material with a thickness of 1 mm, tucking spacer 10b opened with a diameter of 8 mm at the center of a square carbon composite plate with a thickness of 2 mm and one side of 20 mm between respective laminates 10a, threading respective laminates 10a with carbon composite fiber M6 stud bolt 11 constructed on support part 3a with each other, and fixing them using carbon composite fiber nut 12.

P removal processing was performed via the exact same procedure as in the case of Comparative Examples 1, 2 and Example 1, repeating this operation eight times. Moreover, the P removal performance over eight successive operations performed in this Example 2 was evaluated along with Comparative Examples 1, 2 and Example 1.

The results are shown in Table 4.

In this Example 2, from the first to third operations, no SiC particles were found generated on the silicon molten metal surface upon melting the silicon material, both 30 minutes after the completion of melting and two hours after the completion of melting (completion of processing). However, SiC particles were found generated on the silicon molten metal surface upon melting the silicon material in the fourth operation, with the ratio of the coated area of SiC particles indicating SiC production on the molten metal surface area becoming 30% after thirty minutes and increasing to 40% after two hours. The P removal rate (relative value) was 1.8 lower than the second operation. Moreover, with the increase in the operation number, the ratio of the coated area of SiC particles to the molten metal surface area increased, while the dephosphorization removal rate in the eighth operation decreased to 0.5. Upon examining the state of the molten metal surface thermal insulation member after the eighth operation completed and the furnace cooled to ambient temperature, it was found that cracks had generated in the high-density graphite support member, in addition to there being signs that Si steam had entered the insulation material therefrom, along with the discovery that Si had penetrated most surfaces of the laminated insulation member, a large amount of Si had penetrated into the gaps of respective multilayer plates, and most plates had become fixed to each other by silicon. Upon measuring the weight of the multilayer plate after the operation with silicon fixed thereto, the weight of the multilayer plate had increased by about 7.5 kg from the weight prior to the operation. This means that 45% of the cubic measure of the gaps between respective multilayer plates had been replaced with silicon.

TABLE 4

| Operation number | | First | Second | Fourth | Sixth | Eighth |
|---|---|---|---|---|---|---|
| SiC production (ratio: %) | 30 minutes after the completion of melting | 0.0 | 0.0 | 30.0 | 40.0 | 80.0 |
| | two hours after the completion of melting | 0.0 | 0.0 | 40.0 | 80.0 | 100.0 |
| P removal rate (relative value) | | 2.1 | 2.1 | 1.8 | 1.0 | 0.5 |

EXPLANATION OF SYMBOLS

1 . . . molten metal surface thermal insulation member, 1a . . . first molten metal surface thermal insulation member, 1b . . . second molten metal surface thermal insulation member, 2 . . . exhaust opening, 3 . . . support member, 3a . . . support part, 3b . . . cylindrical part 3b, 4 . . . insulation material, 5 . . . a decompression vessel, 6 . . . vacuum pump, 7 . . . crucible, 8 . . . heating device, 9 . . . silicon molten metal, 10 . . . laminated insulation member, 10a . . . laminate, 10b . . . spacer, 11 . . . bolt, 12 . . . nut, 13 . . . washer, 14 . . . surface material, 15 . . . center opening, 16 . . . storage place, 17 . . . Si and Si compound

What is claimed is:

1. A silicon refining device comprising, in a decompression vessel provided with a vacuum pump that reduces a pressure within the decompression vessel to 500 Pa or less:
a crucible with an opening at an upper portion that contains a metal silicon material;
a heating device that heats the crucible; and
a silicon molten metal surface thermal insulation member arranged on the upper portion of said crucible to cover an upper portion of silicon molten metal and having an exhaust opening with an opening area smaller than the silicon molten metal surface area,
wherein the silicon molten metal surface thermal insulation member comprises a support member made of dense graphite, having a support part formed by a flat plate with a center thereof open and a cylindrical part constructed on a center opening edge of the support part, and an insulation material on an upper surface of the support part, said insulation material having a multilayer structure in which three or more layers of carbon fiber composite material are spaced at predetermined intervals from each other, and which exhibits a radiant heat insulating function based on the multilayer structure, and
wherein said layers of the multilayer structure, are respectively separated by a dense graphite spacer with a thickness of 4 mm at intervals of 4 mm or more from each other whereby said thermal insulation member exhibits a radiant heat insulating function.

2. The silicon refining device according to claim 1, wherein said molten metal surface thermal insulation member is formed in a ring shape with an exhaust opening at the center thereof.

3. The silicon refining device according to claim 2, wherein said molten metal surface thermal insulation member comprises a peripheral part that is detachably disposed on the upper portion of said crucible.

4. The silicon refining device according to claim 1, wherein the dense graphite spacer that is inserted between the respective laminates is a nut, with a thickness of 4 mm and a side length of 12 mm.

5. The silicon refining device according to claim 1, wherein the molten metal surface thermal insulation member comprises at least eight carbon composite fiber bolts that connect the support member and the multilayer structure of the insulation material, wherein the layers and the spacers are threaded through by bolts to be integrated by being fixed via a carbon fiber composite nut.

6. The silicon refining device according to claim 1, wherein the insulation material have a multilayer structure in which from five to twelve layers of carbon fiber composite material are spaced at predetermined intervals from each other, and which exhibits a radiant heat insulating function based on the multilayer structure.

7. The silicon refining device according to claim 1, wherein the layers of carbon fiber composite material have a thickness from 0.5 mm to 10 mm.

8. The silicon refining device according to claim 6, wherein the layers of carbon fiber composite material have a thickness from 0.5 mm to 10 mm.

9. The silicon refining device according to claim 1, wherein the molten metal surface thermal insulation member comprises at least three legs to be fixed onto an upper peripheral part of the crucible.

10. The silicon refining device according to claim 3, wherein the molten metal surface thermal insulation member comprises at least three legs to be fixed onto the upper peripheral part of the crucible.

11. The silicon refining device according to claim 1, wherein the size of the exhaust opening on the molten metal surface thermal insulation member is 3% to 20% the size of the silicon molten metal surface area.

12. The silicon refining device according to claim 1, wherein the molten metal surface thermal insulation member comprises a molybdenum-made surface material configured to cover the upper surface of an uppermost layer of the multilayer structure of the insulation material.

13. A silicon refining device comprising in a decompression vessel provided with a vacuum pump:
a crucible with an opening at an upper portion that contains a metal silicon material;
a heating device that heats the crucible; and
a silicon molten metal surface thermal insulation member arranged on the upper portion of said crucible to cover an upper portion of silicon molten metal and having an exhaust opening with an opening area smaller than the silicon molten metal surface area,
wherein the silicon molten metal surface thermal insulation member comprises insulation material with a multilayer structure in which three or more layers of carbon fiber composite are spaced at predetermined intervals of 3 mm from each other, and which exhibits a radiant heat insulating function based on the multilayer structure.

14. The silicon refining device according to claim 13, wherein the molten metal surface thermal insulation member comprises at least eight carbon composite fiber bolts that connect the support member and the multilayer structure of the insulation material, wherein the layers and the spacers are threaded through by bolts to be integrated by being fixed via a carbon fiber composite nut.

* * * * *

UNITED STATES PATENT AND TRADEMARK OFFICE
CERTIFICATE OF CORRECTION

PATENT NO. : 10,370,253 B2
APPLICATION NO. : 14/381150
DATED : August 6, 2019
INVENTOR(S) : Yutaka Kishida et al.

It is certified that error appears in the above-identified patent and that said Letters Patent is hereby corrected as shown below:

In the Claims

Column 16, Line 40, Claim 13, delete "insulation material" and insert -- a support member made of dense graphite, having a support part formed by a flat plate with a center thereof open and a cylinder part constructed on a center opening edge of the support plate, and an insulation material on an upper surface of the support part --

Signed and Sealed this
Twenty-second Day of October, 2019

Andrei Iancu
*Director of the United States Patent and Trademark Office*